(12) United States Patent
Liu

(10) Patent No.: US 6,831,443 B2
(45) Date of Patent: Dec. 14, 2004

(54) POWER ADAPTER ASSEMBLY FOR PORTABLE ELECTRICAL DEVICE

(75) Inventor: Chien-Te Liu, Taipei (TW)

(73) Assignee: Primax Electronics, Ltd. (TW)

( * ) Notice: Subject to any disclaimer, the term of this patent is extended or adjusted under 35 U.S.C. 154(b) by 219 days.

(21) Appl. No.: 10/190,153

(22) Filed: Jul. 5, 2002

(65) Prior Publication Data

US 2003/0080630 A1 May 1, 2003

(30) Foreign Application Priority Data

Oct. 30, 2001 (TW) ........................................ 90126927 A

(51) Int. Cl.$^7$ ............................................. H01M 10/46
(52) U.S. Cl. ..................... 320/113; 439/638; 439/955
(58) Field of Search ........................... 320/113; 439/638, 439/955, 502, 655, 651

(56) References Cited

U.S. PATENT DOCUMENTS

| | | | | |
|---|---|---|---|---|
| 5,736,830 A | * | 4/1998 | Weng | .......................... 320/108 |
| 5,822,427 A | * | 10/1998 | Braitberg et al. | ........... 379/454 |
| 6,172,477 B1 | * | 1/2001 | Kim | ........................... 320/114 |
| 6,244,894 B1 | * | 6/2001 | Miyashita | ................... 439/500 |
| 6,424,124 B2 | * | 7/2002 | Ichihara et al. | ............. 320/149 |
| 6,633,932 B1 | * | 10/2003 | Bork et al. | .................... 710/72 |

* cited by examiner

*Primary Examiner*—Bao Q. Vu
(74) *Attorney, Agent, or Firm*—Madson & Metcalf

(57) ABSTRACT

A power adapter assembly for use between a portable electrical device and a power source is disclosed. The power adapter assembly includes a power connecting device having a first joint at one end thereof for electrically connecting to the portable electrical device and a second joint at the other end thereof, a data storage unit electrically connected with the second joint of the power connecting device and storing the power supply data corresponding to the portable electrical device, and a power adapter having a socket for electrically connecting to the second joint of the power connecting device. The power adapter reads the power supply data stored in the data storage unit, converts the power from the power source into a required power form according to the power supply data, and transfers the required power to the portable electrical device through the power connecting device.

8 Claims, 3 Drawing Sheets

POWER ADAPTER ASSEMBLY FOR PORTABLE ELECTRICAL DEVICE

FIELD OF THE INVENTION

The present invention relates to a power adapter assembly, and more particularly to a power adapter assembly for use between a portable electrical device and a power source.

BACKGROUND OF THE INVENTION

Portable electrical devices such as mobile phones and personal digital assistants (PDA) have become more and more popular due to the convenience of portability and multi-functions. For the purpose of enabling a portable electrical device to be used at all times, the portable electrical device is commonly provided with at least one rechargeable battery which supplies required power to the portable electrical device when an external power source is not available. In order to recharge the rechargeable battery via the built-in charge circuit of the portable electrical device directly, a power adapter is commonly employed to convert the power from the utility power source into a required charge power for the portable electrical device.

Please refer to FIG. 1 which is a schematic view showing a general power adapter for a mobile phone. As shown in FIG. 1, a power adapter 10 is provided to cooperate with the mobile phone 11 for supplying required charge power to recharge the rechargeable battery of the mobile phone 11. Generally, various mobile phones employ various rechargeable batteries and various rechargeable batteries have different specifications. Therefore, the power adapters 10 correspondingly have various specifications, e.g. charging voltage and charging current. Furthermore, a joint 101 of the power adapter 10 and a socket 111 of the mobile phone 11 are also designed into different structures in order to conform to respective mobile phones. When a consumer changes another type of mobile phone, the consumer has to purchase another power adapter having a joint structure matching with the socket of the mobile phone and leave the original power adapter unused. Accordingly, the consumer wastes a lot of cost and produces a lot of unused things. Hence, the main purpose of the present invention is to eliminate the defects encountered by the prior arts.

SUMMARY OF THE INVENTION

It is therefore an object of the present invention to provide a universal type of power adapter for use between a portable electrical device and a power source.

It is further an objective of the present invention to provide a power adapter assembly for use between a portable electrical device and a power source. The power adapter assembly includes a power connecting device, a data storage unit and a power adapter. The power connecting device has a first joint at one end thereof for electrically connecting to the portable electrical device and a second joint at the other end thereof. The data storage unit is electrically connected with the second joint of the power connecting device and storing power supply data specific to the portable electrical device. The power adapter has a socket for electrically connecting to the second joint of the power connecting device. The power adapter reads power supply data stored in the data storage unit, converts the power from the power source into a required power form according to power supply data, and transfers the power in required power form to the portable electrical device through the power connecting device.

Preferably, the portable electrical device is a mobile phone.

According to a first aspect of the present invention, the data storage unit is disposed in the power connecting device. Preferably, the data storage unit is a non-volatility memory. More preferably, the non-volatility memory is one selected from a group consisting of a flash memory, an EEPROM, an EPROM, a PROM and a Mask ROM.

Preferably, the power supply data stored in the data storage unit includes the level of a recharge voltage and/or the level of a recharge current.

According to a second aspect of the present invention, the power adapter further comprises a recognizing device electrically connected with the socket for reading power supply data stored in the data storage unit and outputting a control signal corresponding to power supply data while the second joint of the power connecting device electrically connects with the socket, and a controlled power supply electrically connected with the recognizing device, the power source and the socket for converting the power from the, power source into the required power form in response to the control signal and transferring the power in required power form to the portable electrical device through the power connecting device.

According to a third aspect of the present invention, the socket includes an insertion detecting device for detecting whether the second joint is electrically connected with the socket and initializing the power adapter while the second joint of the power transferring wire is determined to be electrically connected with the socket.

It is further an object of the present invention to provide a power connecting device for use among a portable electrical device, a power adapter and a power source. The power connecting device includes a cable for transmitting power from power source to the portable electrical device, a first joint disposed at one end of the cable for electrically connecting to the portable electrical device, a second joint disposed at the other end of the cable for electrically connecting to a socket of the power adapter, and a data storage unit electrically connected with the second joint and storing therein power supply data specific to the portable electrical device. The power supply data is provided to the power adapter so as to convert the power from the power source to a required power form corresponding to the power supply data, and the power in the required power form is transferred to the portable electrical device through the second joint, cable and first joint while the second joint is electrically connected with the socket of the power adapter.

It is further an object of the present invention to provide a power adapter for use among a portable electrical device, a power connecting device and a power source, wherein the power connecting device includes a data storage unit for storing therein power supply data specific to the portable electrical device. The power adapter reads the power supply data through the socket and the second joint, converts the power from the power source into a required power form corresponding to the power supply data, and transfers the power in required power form to the portable electrical device through the power connecting device while the power connecting device is connected with the power source and the power adapter.

BRIEF DESCRIPTION OF THE DRAWINGS

Now the foregoing and other features and advantages of the present invention will be more clearly understood through the following descriptions with reference to the drawings, wherein.

DETAILED DESCRIPTION OF THE PREFERRED EMBODIMENT

The present invention will now be described more specifically with reference to the following embodiments. It is to be noted that the following description of the preferred embodiment of this invention is presented herein for purpose of illustration and description only; it is not intended to be exhaustive or to be limited to the precise form disclosed.

Figure 1:
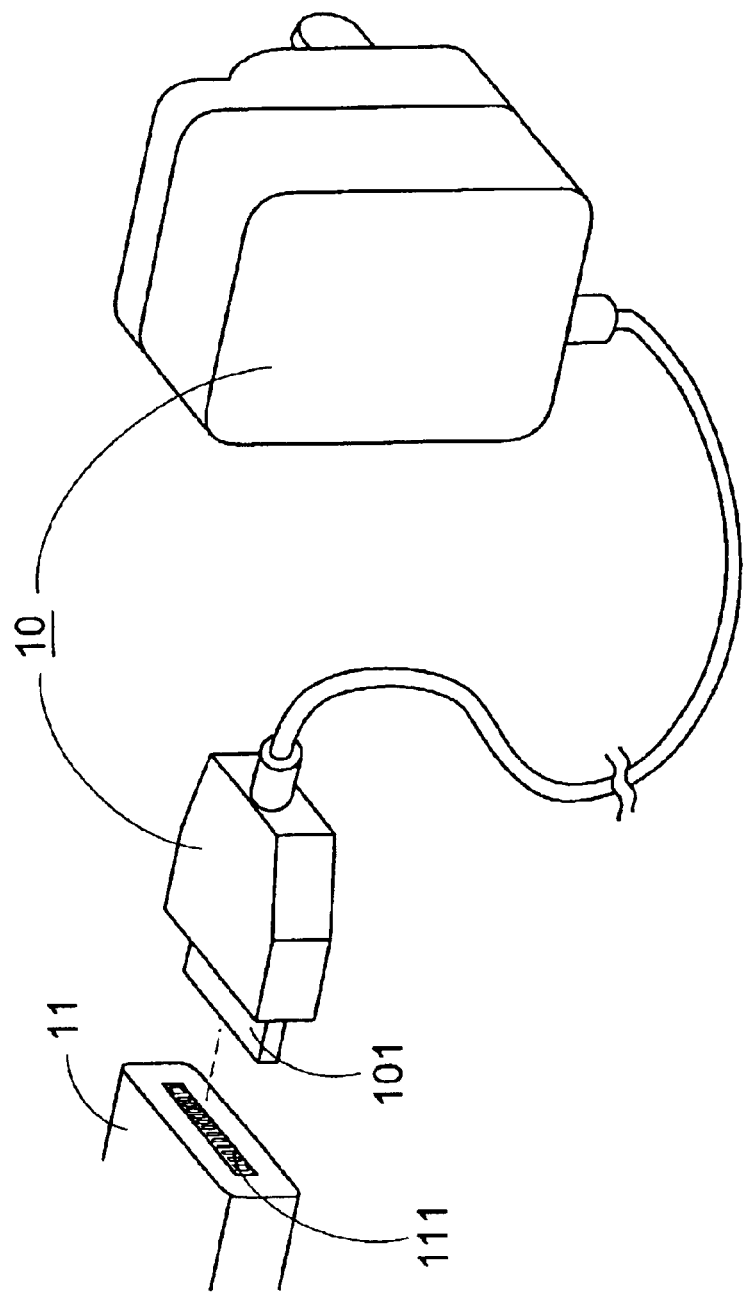
FIG. 1 is a schematic view showing a general power adapter for a mobile phone.
Figure 2:
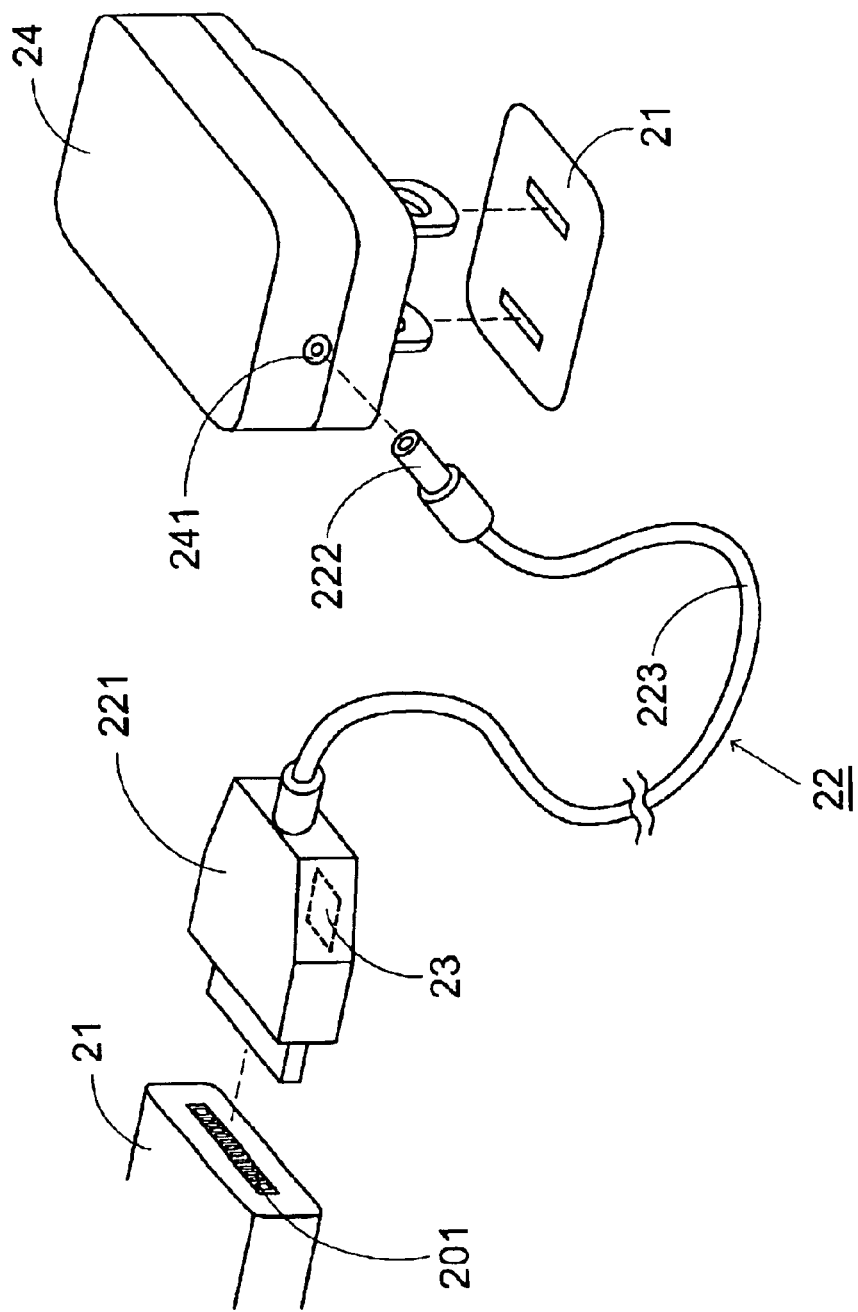
FIG. 2 is a schematic view showing a preferred embodiment of a power adapter assembly according to the present invention.

Please refer to FIG. 2 which is a schematic view showing a preferred embodiment of a power adapter assembly according to the present invention. As shown in FIG. 2, the power adapter assembly is applied between a portable electrical device 20 such as a mobile phone or personal digital assistant and a power source 21 such as a utility power or DC power used in a car. The power adapter assembly includes a power connecting device 22, a data storage unit 23 and a power adapter 24. The power connecting device 22 includes a first joint 221, a second joint 222 and a cable 223, where the first joint 221 is disposed at one end of the cable 223, and electrically connected to a socket 201 of the portable electrical device 20, and the second joint 222 is disposed at the other end of the cable 223 for detachably connecting to a socket 241 of the power adapter 24. The data storage unit 23 is disposed in a shell of the first joint 221. Certainly, the structures of the first joint 221 and the second joint 222 are variable according to the structures of the socket 201 on the portable electrical device 20 and the socket 241 on the power adapter 24, respectively.

Figure 3:
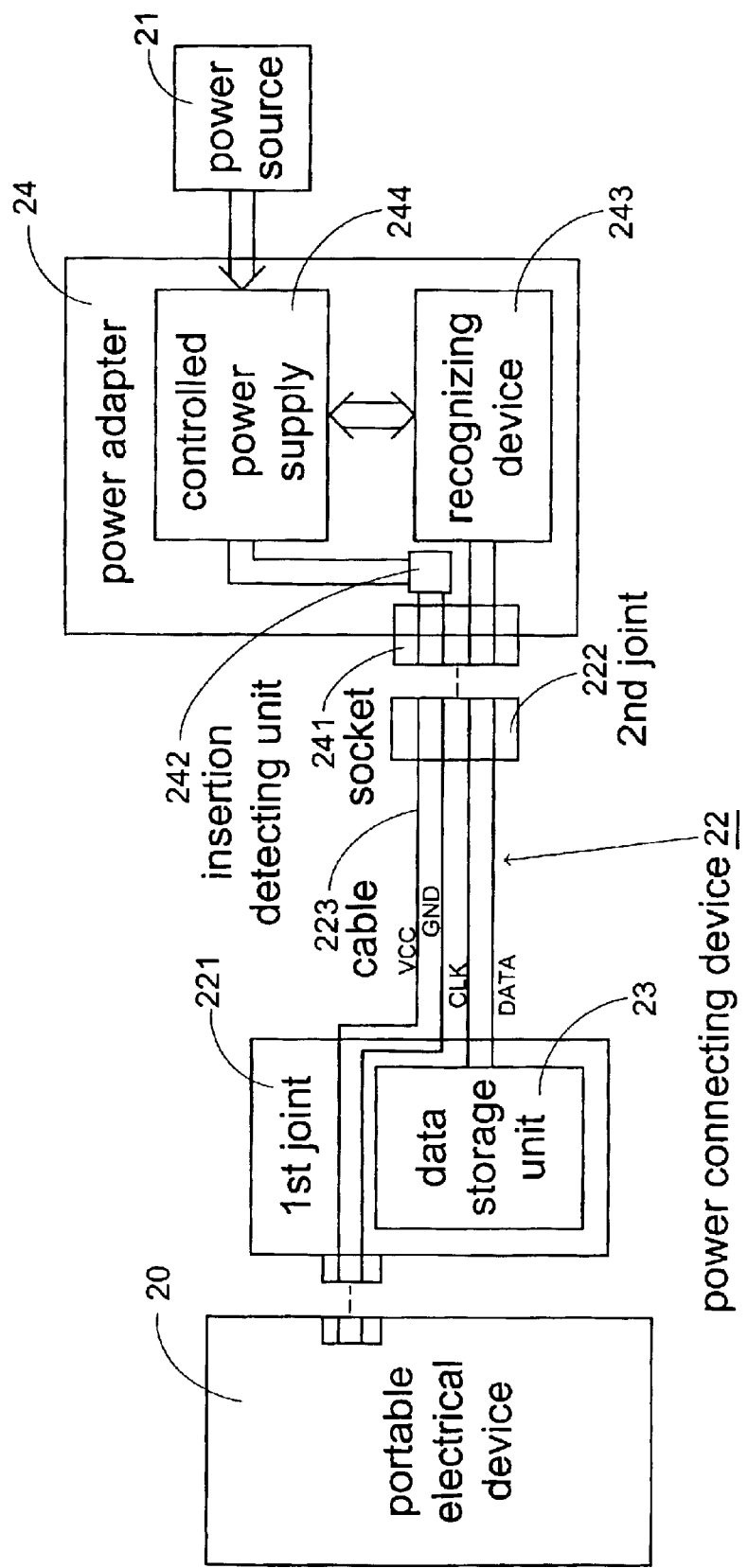
FIG. 3 is an exemplified circuit block diagram showing the power adapter assembly of FIG. 2.

Please refer to FIG. 3 which is a circuit block diagram of the power adapter assembly of FIG. 2. As shown in FIG. 3, the data storage unit 23 disposed in the shell of the first joint 221 employs a non-volatility memory for storing a power supply data, e.g. the level of a recharge voltage and/or the level of a recharge current, specific to the type and model of the portable electrical device 20. For example, the non-volatility memory can be a flash memory, EEPROM, EPROM, PROM or Mask ROM.

The power adapter 24 further includes a recognizing device 243 and a controlled power supply 244, where the recognizing device 243 is electrically connected with the controlled power supply 244 and the socket 241. The recognizing device 243 of the power adapter 24 reads the power supply data stored in the data storage unit 23 and outputs a control signal to the controlled power supply 244 in response to the power supply data while the second joint 222 of the power connecting device 22 is electrically connected with the socket 241, and then the controlled power supply 244 converts the power from the power source 21 into a required power form in response to the control signal and transfers the required power to the portable electrical device 20 through the socket 241 and the power connecting device 22. Certainly, the socket 241 of the power adapter 24 can be designed to have an insertion detecting unit 242 for detecting whether the second joint 222 is electrically connected with the socket 241 and initializing the power adapter 24 while the second joint 222 of the power connecting device 22 is determined to be electrically connected with the socket 241 of the power adapter 24.

According to the above description, the power adapter 24 according to the present invention has functions of recognition of the portable electrical device and auto-adjustment of the supplied power. Hence, it is easy to supply power to the portable electrical device 20 in a required form by using a specific power connecting device 22 having a specification corresponding to that of the portable electrical device 20. Giving a mobile phone as an example of the portable electrical device, when a consumer changes a new mobile phone of a different phone type or model, the consumer needn't to change the power adapter 24, and in stead, only needs to purchase a specific power connecting device 22 having a joint matching with the socket of the specific mobile phone and including the power supply data of the specific mobile phone. When the power adapter 24 according to the present invention is electrically connected to the new mobile phone through the power connecting device 22, the power adapter 24 will recognize the type and model of the mobile phone, and output required recharge power to the phone in a proper form. That effectively eliminates the defects of leaving the original power adapter unused and accomplishes the main purpose of the present invention.

While the invention has been described in terms of what are presently considered to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. A power connecting device for use among a portable electrical device, a power adapter and a power source, comprising:

a cable for transmitting power from said power source to said portable electrical device;

a first joint disposed at one end of said cable for electrically connecting to said portable electrical device;

a second joint disposed at the other end of said cable for electrically connecting to a socket of said power adapter; and a data storage unit disposed in the shell of said first joint and electrically connected with said second joint, said data storage unit storing therein the power supply data specific to said portable electrical device, said power supply data being provided to said power adapter when said second joint is electrically connected to said socket of said power adapter and referred by said power adapter to convert the power signal from said power source into a required power form adapted to said portable electrical device.

2. The power connecting device according to claim 1 wherein said power adapter further comprises:

a recognizing device electrically connected with said socket for reading said power supply data stored in said data storage unit and outputting a control signal corresponding to said power supply data while said second joint of said power connecting device electrically connects with said socket; and a controlled power supply electrically connected with said recognizing device, said power source and said socket for converting the power from said power source into said required power form in response to said control signal and transferring the power in said required power form to said portable electrical device through said power connecting device.

3. The power connecting device according to claim 1 wherein said socket comprises an insertion detecting device for detecting whether said second joint of said connecting device is electrically connected with said socket and initializing said power adapter while said second joint is determined to be electrically connected with said socket.

4. The power connecting device according to claim 1 wherein said portable electrical device is a mobile phone.

5. The power connecting device according to claim 1 wherein said data storage unit is a non-volatility memory.

6. The power connecting device according to claim 5, wherein said non-volatility memory is one selected from a group consisting of a flash memory, an EEPROM, an EPROM, a PROM and a Mask ROM.

7. The power connecting device according to claim 1 wherein said power supply data stored in said data storage unit comprises the level of a recharge voltage.

8. The power connecting device according to claim 1 wherein said power supply data stored in said data storage unit comprises the level of a recharge current.

* * * * *